(12) United States Patent
Inamdar

(10) Patent No.: US 9,513,895 B2
(45) Date of Patent: Dec. 6, 2016

(54) METHOD AND SYSTEM FOR PATCH AUTOMATION FOR MANAGEMENT SERVERS

(71) Applicant: Oracle International Corporation, Redwood City, CA (US)

(72) Inventor: Sonali Inamdar, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 306 days.

(21) Appl. No.: 13/665,218

(22) Filed: Oct. 31, 2012

(65) Prior Publication Data

US 2014/0123125 A1 May 1, 2014

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
USPC ........................................................ 717/173
See application file for complete search history.

(56) References Cited

U.S. PATENT DOCUMENTS

| | | | | |
|---|---|---|---|---|
| 7,630,381 B1* | 12/2009 | Roskind et al. | ......... | 370/395.42 |
| 2004/0003266 A1* | 1/2004 | Moshir et al. | ................ | 713/191 |
| 2004/0260982 A1* | 12/2004 | Bhowmik et al. | ............... | 714/43 |
| 2009/0222656 A1* | 9/2009 | Rouskov et al. | ............. | 713/155 |
| 2011/0078675 A1* | 3/2011 | Van Camp | ................ | G06F 8/65 717/170 |
| 2011/0138374 A1* | 6/2011 | Pal | ............................... | 717/169 |
| 2012/0102480 A1* | 4/2012 | Hopmann | ................. | G06F 8/67 717/172 |

* cited by examiner

*Primary Examiner* — Hang Pan
(74) *Attorney, Agent, or Firm* — Osha Liang LLP

(57) ABSTRACT

A method for automatically patching a management server in a distributed network. The method includes receiving an instruction to patch an unpatched management server. Retrieving, from a software repository, a patch file comprising a patch for the unpatched management server, where the unpatched management server is configured to manage a distributed application in the distributed network, and where the unpatched management server is located on a node of the distributed network. Establishing a connection with a management agent located on the node, where the management agent is configured to communicate with the unpatched management server over the network and manage a part of the distributed application that is located on the node. Sending, over the connection, the patch file to the management agent. Receiving, by the management agent, the patch file. Applying, by the management agent, the patch to the unpatched management server to obtain a patched management server.

20 Claims, 6 Drawing Sheets

METHOD AND SYSTEM FOR PATCH AUTOMATION FOR MANAGEMENT SERVERS

BACKGROUND

Distributed software applications are becoming increasingly prevalent due to the pervasiveness of networked computers, and need to parallelize computer programs in order to increase performance. Distributed applications are not on the same machine, but rather are split into many instances. Thus, management of the programs requires some form of coordinated distributed management apparatus. Often management applications themselves are distributed. Thus, management applications also should be managed.

SUMMARY

In general, in one aspect the invention relates to a method for automatically patching a management server in a distributed network, including, receiving an instruction to patch an unpatched management server from an administrative server, retrieving, from a software repository, a patch file comprising an patch for the unpatched management server, where the unpatched management server is configured to manage a distributed application located in the distributed network, and where the unpatched management server is located on a node of the distributed network, establishing a connection with a management agent located on the node, where the management agent is configured to communicate with the unpatched management server over the network and manage a part of the distributed application that is located on the node, sending, over the connection, the patch file to the management agent, receiving, by the management agent, the patch file, and applying, by the management agent, the patch to the unpatched management server to obtain a patched management server.

In general, in one aspect the invention relates to a distributed network, including a node, which includes a management server, which includes an agent client layer, a management agent, configured to establish a connection with the agent client layer, receive, via the connection, a patch file, and apply a patch contained within the patch file to the management server, a management server patcher (MSP), including an MSP agent client layer, configured to establish a connection with the management agent in an identical manner to the agent client layer, a secure services layer, configured to communicate with a software repository and an administrative server; and a patcher module, configured to receive, via the secure services layer, instructions to distribute the patch file from the administrative server retrieve, via the secure services layer, the patch file from the software repository, and distribute the patch file to the node using the connection between the MSP agent client and the management agent.

In general, in one aspect the invention relates to a non-transitory computer readable medium, including instructions, which when executed on a processor, perform a method, the method including automatically patching a management server in a distributed network, including, receiving an instruction to patch an unpatched management server from an administrative server, retrieving, from a software repository, a patch file comprising an patch for the unpatched management server, where the unpatched management server is configured to manage a distributed application located in the distributed network, and where the unpatched management server is located on a node of the distributed network, establishing a connection with a management agent located on the node, where the management agent is configured to communicate with the unpatched management server over the network and manage a part of the distributed application that is located on the node, sending, over the connection, the patch file to the management agent, receiving, by the management agent, the patch file, and applying, by the management agent, the patch to the unpatched management server to obtain a patched management server.

Other aspects of the invention will be apparent from the following description and the appended claims.

DETAILED DESCRIPTION

Specific embodiments of the invention will now be described in detail with reference to the accompanying figures. In the following detailed description of FIGS. 1A-4B, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a method and system for distributing and applying a patch to one or more distributed management servers residing on a node in a distributed network. More specifically, embodiments of the invention use a management server patcher (MSP) that leverages a management agent sharing a node with the management server, in order to patch the management server. A patch is a piece of software, or portion of additional or replacement code for enhancing or correcting the functionality of an application. When executed on, or applied to, an existing computer program, a patch corrects problems, updates or adds functionality. A patch may be a combination of a software program and a portion of code, in that the patch may be an executable configured to apply the portion of code to the program being patched. A patch targeting a distributed application may be divided into multiple distinct portions according to function, content and target. A patch may also be made up of a number of smaller independent patches. In one embodiment of the invention, the patch is composed of a larger number of files, which are compressed into an archive 'patch file'.

Figure 1A:
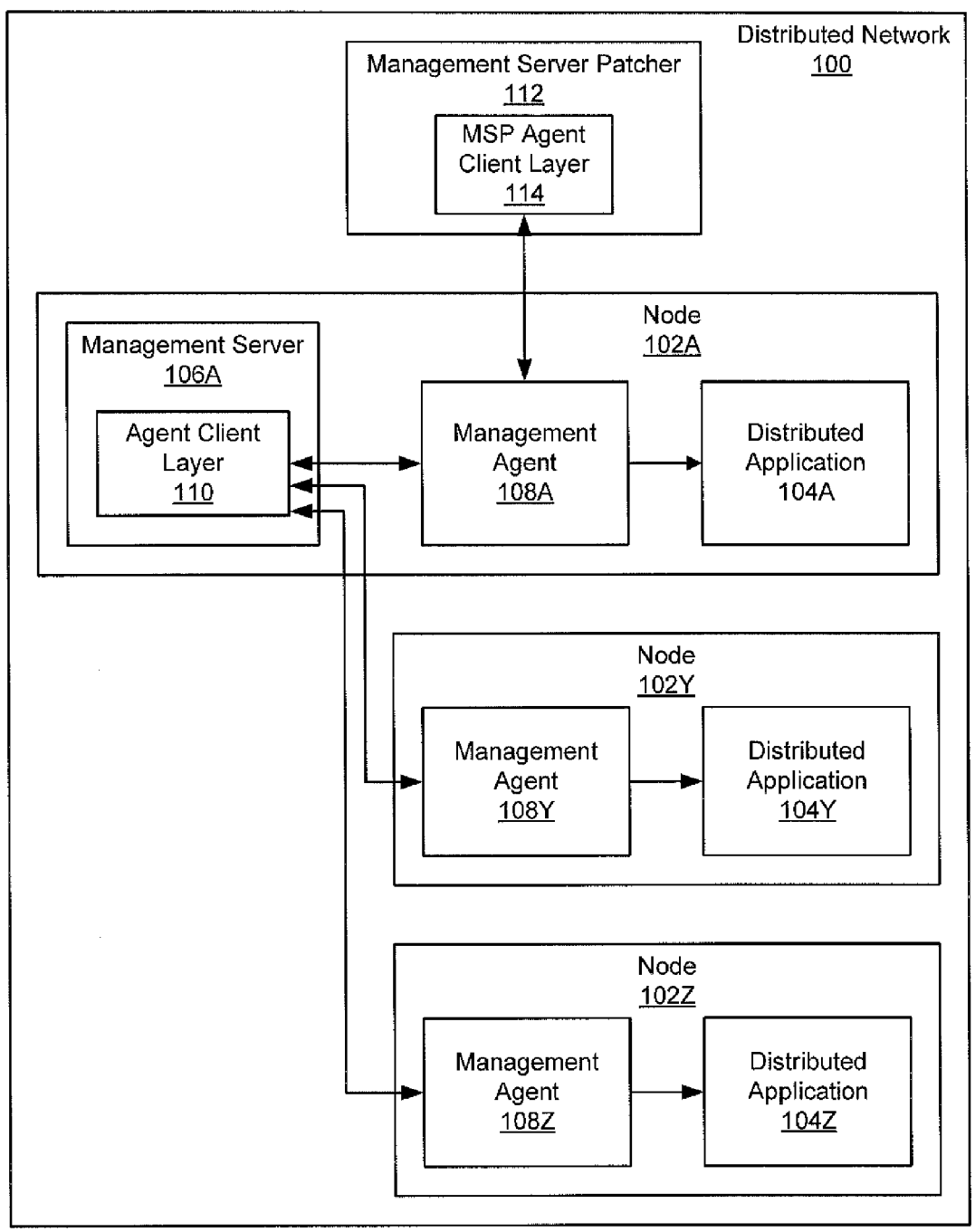
FIG. 1A shows a diagram of a distributed network in accordance with one embodiment of the invention.

FIG. 1A shows a distributed network (100) in accordance with one embodiment of the invention. The distributed network (100) may be spread across a variety of execution environments, physical machines, sub-networks, network clusters, or geographic locations. There are many possible embodiments of the distributed network (100), encompassing many possible variations of scale, topology, configuration and organization.

The distributed network (100) includes of a plurality of nodes (102). Like the distributed network (100), the nodes (102) may be spread across a variety of environments, machines and locations. In one embodiment of the invention, each node may be a computer system with a processor, a memory and the ability to communicate over the distributed network (100). The nodes (102) may or may not be configured to communicate with each other directly, and may be aware or unaware of each other. Alternately or additionally, the nodes (102) may be configured to operate as a single entity, and the distribution and physical separation of the nodes is hidden by an operating system, virtual environment, or other abstraction.

In one embodiment of the invention, the distributed network (100) includes functionality to host and execute all or part of a distributed application (104). A distributed application (104) is a computer program that is not confined to executing on a single physical computer. The distributed application (104) may have two or more distinct portions (104A, 104Y, 104Z) spread across two or more of the nodes (102A, 102Y, 102Z) of the distributed network (100). The portions of the distributed application (102A, 102Y, 102Z) may be independent execution threads, distinct processes, identical copies of the same application, sub-applications comprising a larger program, or many other possible subsets of a computer program. Alternately or additionally, instead of a distributed application (104), the distributed network (100) may include functionality to host and execute one or more single server applications (i.e. applications that reside entirely on one node). In one embodiment of the invention, the distributed application (104) includes functionality to manage a distributed database, composed of storage distributed across the nodes (102). A wide variety of potential uses for distributed applications (104) may be used without departing from the scope of the invention, including management of extensible computing resources (cloud computing), management of network traffic, the hosting of websites and/or services, and many other network-based purposes.

In one embodiment of the invention, the distributed application (104) is managed by a management server (106A). As a distributed application (104) has multiple components, located on multiple nodes (102A, 102B, 102C) in the distributed network (100), the management server (106A) provides convenient single point access to the distributed application (100) for the purpose of carrying out administrative tasks. The management server (106A) includes functionality to distribute and apply patches to the distributed application (104) using the distributed network (100) infrastructure. The management server (106A) accesses the distributed application (104) via management agents (108A, 108Y, 108Z) located on the nodes that the portions of the distributed application (104A, 104Y, 104Z) occupy. The management server (106A) is also located on a node (102A) of the distributed network. The management server controls and communicates with the management agents (108A, 108Y, 108Z) via an agent client layer (110) located in the management server (106A). In one embodiment of the invention, the management server (106A) may be configured to manage the allocation of resources, data flow, location, distribution and other details of the distributed application (104), in addition to distributing and applying patches.

In one embodiment of the invention, management agents (108A, 108Y, 108Z) are located on the nodes (102A, 102B, 102C) that include the distributed application (104). The management agents (108A, 108Y, 108Z) may be controlled by the management server (106A) to facilitate the distribution and application of patches to the distributed application (104). The management agents (108A, 108Y, 108Z) include functionality to communicate with the management server (106A) over the distributed network (100). In one embodiment of the invention, the management agent (108A) that shares the node (102A) with the management server (106A) includes functionality to communicate with the management server (106A) directly. Thus, in one embodiment, the management agent (108A) that shares the node (102A) with the management server (106A) may communicate over the network or directly with the management server (106A). In one embodiment of the invention, the management agents (108A, 108Y, 108Z) are mostly autonomous and simply receive instructions and patch files from the management server (106A). In this case, the management agents (108A, 108Y, 108Z) are configured to extract and execute or apply the patch themselves, in addition to other tasks that might be required. Alternately, the management agents (108A, 108Y, 108Z) may be configured to simply act as proxies for the management server (106A), and no actual functionality is located in the management agents (108A, 108Y, 108Z) other than communicating with, and performing actions dictated directly by, the management server (106A). There are many possible configurations of management agents (108A, 108Y, 108Z) with varying degrees autonomy that may be used as well.

In one embodiment of the invention, the management server (106A) side of communication between the management server (106A) and the management agents (108A, 108Y, 108Z) is handled by an agent client layer (110) located in the management server (106A). The agent client layer (110) may be configured to directly communicate with the management agents (108A, 108Y, 108Z). Alternately, the agent client layer (110) may be an abstraction for multiple agent clients, each of the agent clients is tasked with communicating with only one of management agents (108A, 108Y, 108Z). In one embodiment of the invention, the agent client layer (110) may initiate communication with the management agents (108A, 108Y, 108Z) by sending a request. The management agents (108A, 108Y, 108Z) may then respond to the request in order to establish a connection. In one embodiment of the invention, the response prompts the agent client layer (110) to present credentials, a key, or some other form of authentication to the management agent (108A, 108Y, 108Z) in order for the connection to be established.

In one embodiment of the invention, a management server patcher (MSP) (112) is software and/or hardware that includes functionality to distribute and apply patches to the management server (106A). The MSP (112), has functionality to communicate with a management agent (108A) located on the same node as the management server (106A), using the same system the management server (106A) uses to communicate with the management agent (108A) to provide patches to distributed application (104A). The MSP (112) uses this connection to leverage the management server's (106A) own management agent (108A) (i.e., the management agent that is used by the management server to apply patches to the distributed application) to patch the management server. In one embodiment of the invention, the MSP (112) connects to the management agent (108A) sharing the node (102A) with the management server (106A), using a MSP agent client layer (114).

The MSP agent client layer (114) is the same as the agent client layer (110), and allows the MSP to control the management agent (108A) as if it were the management server (106A). This allows the MSP to use the management agent (108A) to apply the patch to management server (106A), as the management server (106A) would use the management agent (108A) to apply a patch to the portion of the distributed application (104A) residing on the node (102A).

Figure 1B:
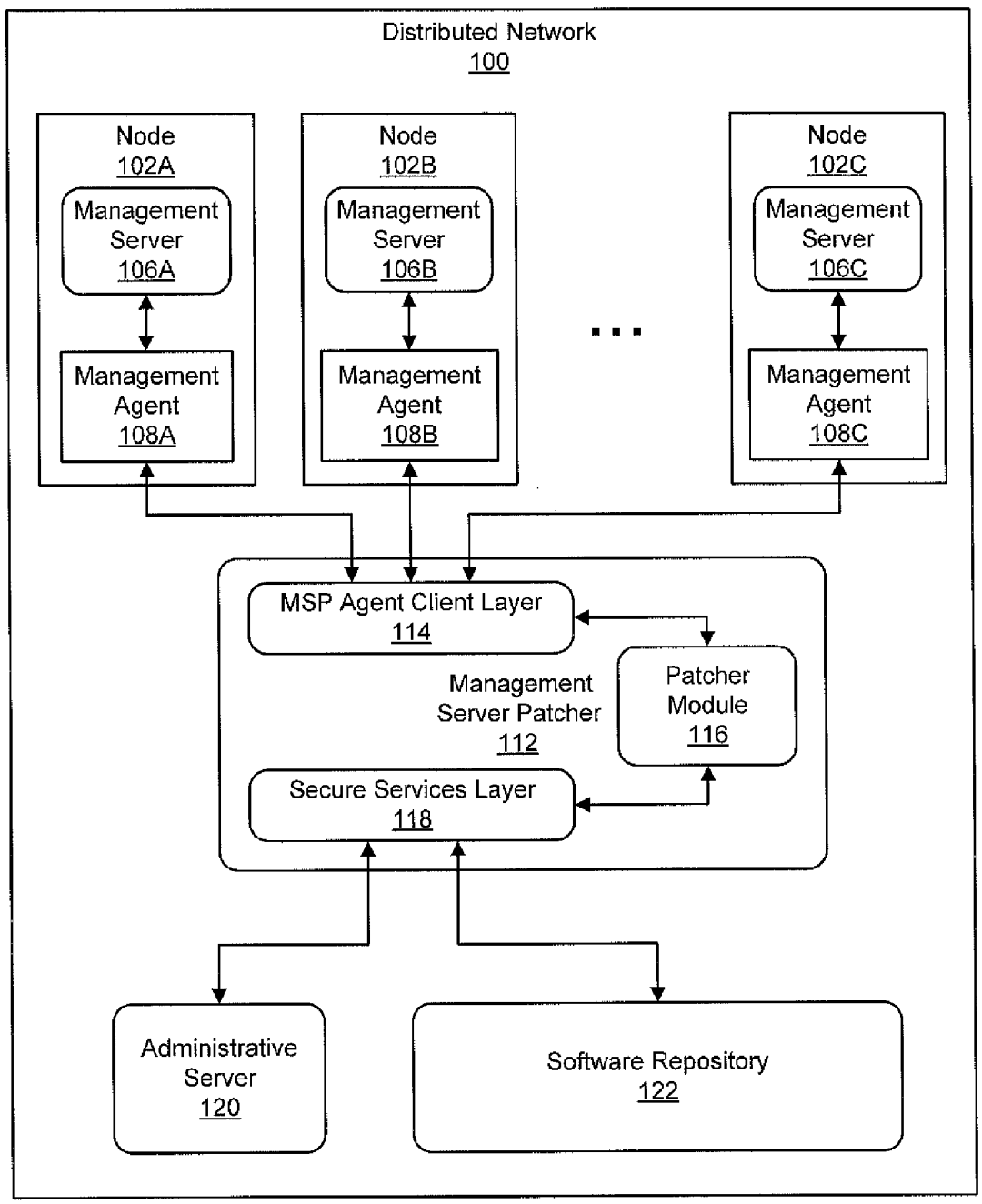
FIG. 1B shows a diagram of the distributed network with a more detailed view of system for patch distribution in accordance with one embodiment of the invention.

FIG. 1B shows the distributed network (100) of FIG. 1, with a greater focus on the components, connections, and operation of the MSP (112).

In one embodiment of the invention, multiple nodes have management servers (106A, 106B, 106C) located on them. Similar to the management server (106A) show in FIG. 1A, each of the additional management servers (106B, 106C) shown in FIG. 1B has at least one management agent (108B, 108C) located on the same node (102B, 102C). Not shown in FIG. 1B, but present in at least one embodiment of the invention are additional distributed applications (102) controlled by the additional management servers (108B, 108C). In one embodiment of the invention, the additional distributed applications are located on the additional nodes (102B, 102C), as well as other nodes, not shown. The portions of the additional distributed applications located on the other nodes are also managed by management agents (108) controlled by the additional management servers (106B, 106C). Also not shown in FIG. 1B, each of the additional management servers (106B, 106C) includes an agent client layer which it uses to communicate with the various management agents (108) it controls.

In one embodiment of the invention the MSP (112) is located on one of the nodes (102A, 102B, 102C) of the distributed network (100). If the MSP (112) is located on one of the nodes (102A, 102B, 102C) that also includes a management server (106A, 106B, 106C), the management server patcher is separated from the management server (106A, 106B, 106C).

As stated in the above description of FIG. 1A, in one embodiment of the invention, the MSP includes an MSP agent client layer, which it uses to control the management agents (108A, 108B, 108C) which occupy the same nodes (102A, 102B, 102C) as the management servers (106A, 106B, 106C). In one embodiment of the invention, the mechanism protocol by which the MSP agent client layer (114) connects to all of the management agents (108A, 108B, 108C) is the same. The connection with the management agents (108A, 108B, 108C) may require establishing trust or presenting security credentials. There are many possible ways for the MSP agent client layer (114) and the management agents (108A, 108B, 108C) to establish a trusted connection. In one embodiment of the invention, as different nodes (102A, 102B, 102C) may use different technology, or execute different operating systems, the connections between the MSP agent client layer (114) and management agents (108A, 108B, 108C) located on different nodes may require different methods of connection or communication. Such different methods may include different network protocols, infrastructure, addressing, routing and many other possible variants, depending on specific requirements of the hardware and software of the distributed network (100). Different distributed applications (104) or different portions of a distributed application (104) may have different security or permissions levels; different methods of communication, or the physical and virtual location of a node (102A, 102B, 102C) may also necessitate the use of different methods of establishing trust or authentication. For example, a management agent (108A, 108B, 108C), associated with a management server (106A, 106B, 106C) that is managing a distributed database for a financial institution may require more security protocols, and have a more stringent authentication process than a management agent (108A, 108B, 108C), associated with a management server (106A, 106B, 106C) that is managing a distributed server that is providing hosting for a number of non-commercial websites.

In one embodiment of the invention, the logic of the MSP (112) is located in a patcher module (116). The patcher module (116) includes functionality to interpret instructions received from the administrative server (120) via a secure services layer (118). In one embodiment of the invention, the patcher module (116) includes functionality to retrieve the patch file from a software repository (122), upon receiving instructions to do so from the administrative server (120). The patcher module (116) includes functionality to distribute the patch to the various nodes (102A, 102B, 102C) that include management servers (106A, 106B, 106C). In one embodiment of the invention, the patcher module (116) includes functionality control the management agents (108A, 108Y, 108Z) through the MSP agent client layer (114) and use them to directly apply the patch to the management servers (106A, 106B, 106C). The patcher module (116) may be required to extract the files and executables that form the actual patch, from the patch file, before distributing it. In one embodiment of the invention, the patcher module (116) includes functionality to determine that additional files will be required for the application of the patch, and obtain and distribute them alongside the patch file.

In one embodiment of the invention, the secure services layer (118) located in the MSP (112) includes functionality to provide a secure connection with the various backend components of the distributed network (100). The backend components may include an administrative server (120) and a software repository (122). The administrative server (120) includes functionality to receive instructions and other data from the administrator of the distributed network (100) for the MSP (112). The administrative server then passes the instructions and other data to the MSP.

In one or more embodiments of the invention, the software repository (122) is any type of storage unit and/or device (e.g., a file system, database, collection of tables, or any other storage mechanism) for storing data. Further, the software repository (122) may include multiple different storage units and/or devices. The multiple different storage units and/or devices may or may not be of the same type or located at the same physical site. The software repository (122) may store information, such as version numbers, hardware profile information, topological mapping and other administrative metadata, for various applications running on the distributed network (100). The software repository (122) may also store actual software, such as components of the distributed network infrastructure, such as patches, updates, backups and the like.

Figure 2:
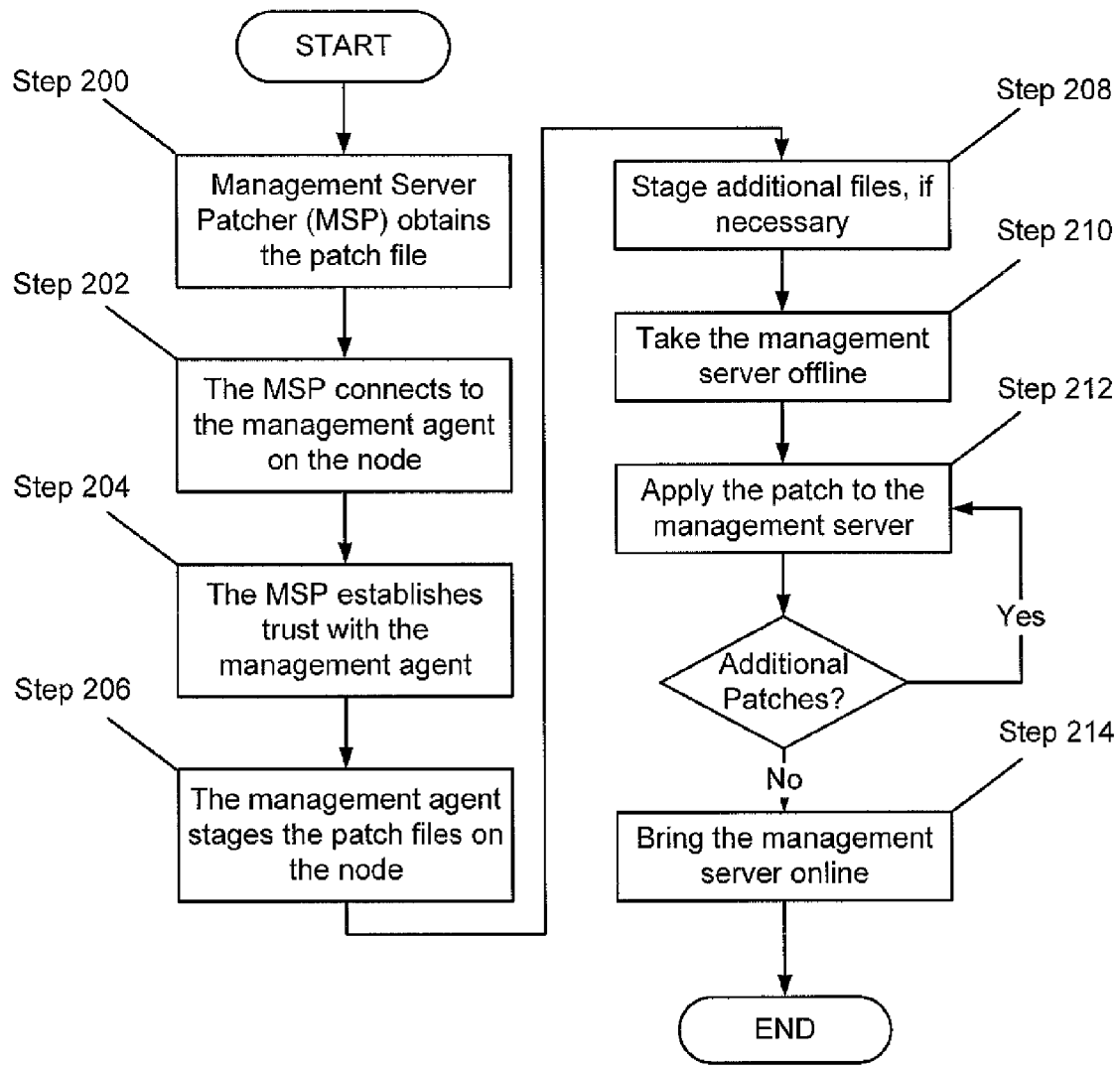
FIG. 2 shows a flowchart for distributing and applying the patch in accordance with one embodiment of invention.
Figure 3:
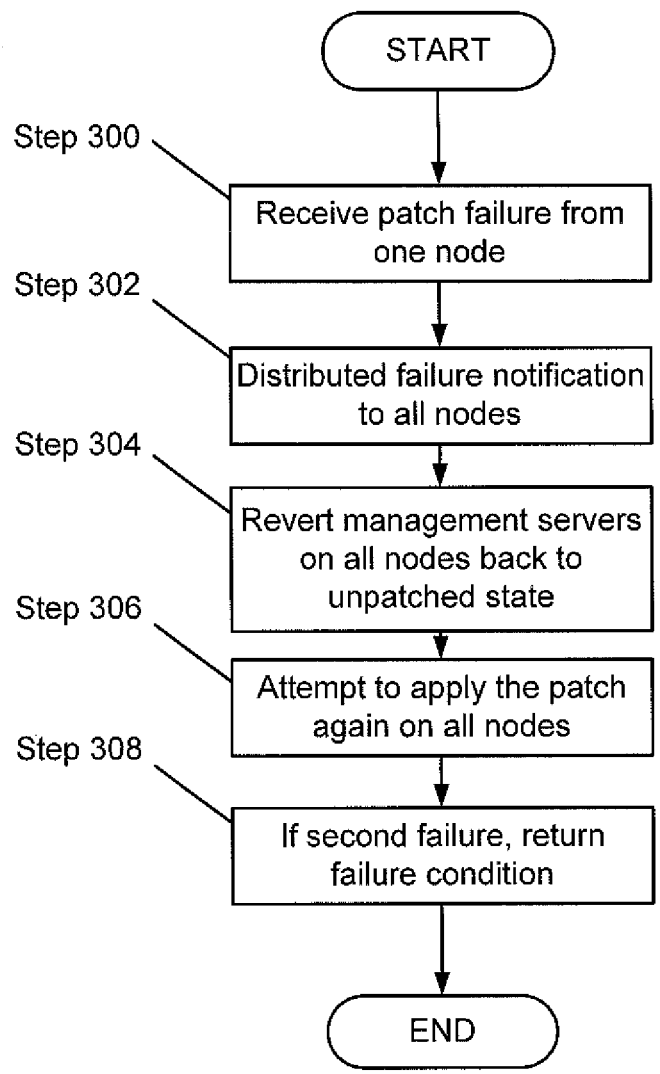
FIG. 3 shows a flowchart for a fail case of application of the patch in accordance with one embodiment of the invention.

FIGS. 2 and 3 show flowcharts in accordance with one embodiment of the invention. While the various steps in the flowcharts are presented and described sequentially, on of ordinary skill will appreciate that some or all of the steps may be executed in different orders, may be combined or omitted, and some or all of the steps may be executed in parallel.

Turning to FIG. 2, FIG. 2 shows a flowchart for distributing and applying a patch to a management server located on a node, in accordance with one embodiment of the invention.

In Step 200, the MSP obtains the patch file. In one embodiment of the invention, the MSP may receive instructions from the administrative server to patch the managements server, and retrieve the patch file from the software repository.

In Step 202, the MSP connects to the management agent that is located on the same node as the management server. The MSP connects to the management agent over the existing distributed network infrastructure.

In Step 204, the MSP establishes trust with the management agent. In one embodiment of the invention, establishing trust with a management agent may include presenting a secret key to the management agent. In one embodiment of the invention, the key is retrieved from a storage device. The key may be generated and encrypted by the management agent when it is created, then stored in the storage device. In one embodiments of the invention, the decryption algorithm is known only to the management server and MSP, so establishing trust with the management agent may include retrieving and decrypting the key, then sending it to the management agent when prompted to do so. There are many possible methods for the MSP to establish a trusted connection with the management agent that may be used without departing from the scope of the invention.

In Step 206, the MSP provide, information to enable the management agent to stage the patch on the node. Staging the patch file includes providing the contents of the patch to the node, and performing any additional steps necessary for the application of the patch to be performed. In one embodiment of the invention, the management agent receives the patch as a patch file, and extracts the contents onto the node. Alternately, the MSP extracts the contents of the patch file, and stages them on the node directly. In one embodiment of the invention, before staging the contents of the patch file the management agent creates an execution environment on the node. The execution environment may necessary for executing the patch, or the software that will apply the patch.

In Step 208, the management agent stages additional files on the node. In one embodiment of the invention, the additional files may be executables, linked libraries or object files required to install the patch. Alternately, the additional files may be templates used as a delivery mechanism for the patch. In one embodiment of the invention, the additional files may contain metadata updates.

In Step 210, the management server is taken offline. Taking the management server offline may include killing any executing management server process. Alternately, the management server may only be suspended. The operation load of the management server may be shifted to other management servers, or the management server system may experience downtime. In one embodiment of the invention, a duplicate instance of the management server is created and used while the management server is being patched. In one embodiment of the invention, the management server may be patched while it is still running, and Steps 310 and 312 may be omitted. In one embodiment of the invention, when multiple management servers are being patched the MSP ensures that not all management servers are taken offline at the same time.

In Step 212, the patch is applied to the management server. In one embodiment of the invention, applying the patch may include simply altering the bits of the management server executable. Alternately, entire files, libraries or sub-applications of the management server may be replaced. In one embodiment of the invention, the management server is replaced entirely. Applying the patch may require that some patch completion software be run, and that the appropriate metadata, both local to the management server, and external, be updated. In one embodiment of the invention, applying the patch may include running diagnostics or profiling software while the management server is down. If more than one patch is being applied in the same instance, each patch is sequentially applied upon the successful application of the preceding patch.

In one embodiment of the invention, a copy of the management server software bits is located in an 'install' directory of a file system located in the distributed network. In order to patch the management server, the bits of the patch are applied to the copy located in the 'install' directory. In one embodiment of the invention, the distributed management servers execute the software located in the 'install' directory, and at this point the management servers are patched. Management servers on distinct nodes may execute from the same 'install' directory located elsewhere in the distributed network. Alternately, after the copy in the 'install' directory has been patched, the copy is distributed to the nodes in lieu of the patch itself, and where the patch would be applied, instead the management software is replaced.

In Step 214, after all patches have been successfully applied, the management server is brought back online. In one embodiment of the invention, the management server is brought online to test the success of the each patching before the next patch is applied.

FIG. 3 shows a flowchart for the steps taken by the system in the event of a patch application failure on one of the management servers in accordance with one embodiment of the invention. Patch application failure may occur if some part of the patch or management server is corrupted; if some steps in the patch application process are omitted or performed in the wrong order; if the patch application is interrupted by some external event, such as a power failure; or any one of a number of other reasons. There are many possible things that can cause a patch application to fail.

In Step 300, the MSP receives a notification from a management agent on at least one of the nodes that application of the patch has failed. The management agent may detect that a patch has failed when it attempts to bring the management server back online. Alternately, the management agent may run a diagnostic after applying the patch, or detect that something is amiss while applying the patch. In one embodiment of the invention the management agent sends a notification to MSP including the details of the failure. Alternately, the MSP may treat lack of a notification of success as proof of failure.

In one embodiment of the invention, the management agent may be configured to attempt to deal with the failure itself, before informing the MSP. The management agent may attempt to reapply the patch for a predefined number of times before returning a failure notification. If the management agent is unable successfully apply the patch to the management server, it may be configured to return the management server to its unpatched state, before notifying the MSP of the failure.

In Step 302, in response to receiving a failure notification from one management agent, the MSP notifies the remainder of the management agents of the failure. In addition to the notification, the MSP may instruct the remainder of the management agents to execute failure recovery and restoration operations.

In Step 304, the MSP instructs all of the management agents to revert (or rollback) the management server to their unpatched states until the issue has been identified and dealt with. The MSP may recover and distribute the unpatched version of the management server to the nodes in order for the management agents to revert it. Alternately, the management agents may undo the patch to revert the management server to its unpatched states.

In Step 306, each management agent attempts to apply the patch to the management server again. In one embodiment of the invention, the management agents may use the original copy of the patch in the second attempt to patch the management server. Depending on the nature of the failure, the MSP may retrieve a fresh copy of the patch from the software repository and distribute it to the nodes for the second attempt. In one embodiment of the invention, the patch may only need to be reapplied on certain nodes that exhibited a specific failure condition.

In Step 308, if at least one of the management agents returns a second failure condition, the MSP reports that the application of the patch has failed. In one embodiment of the invention, the second failure condition must be the same as the first for the entire patch distribution system to fail out. In another embodiment of the invention, the second failure notification must come from the same node in order for the system to fail. In different embodiments of the invention, different numbers of failure conditions may occur before the MSP returns a failure notification. In one embodiment of the invention, the MSP failing to return a success notification is tantamount to the MSP returning a failure condition.

Figure 4A:
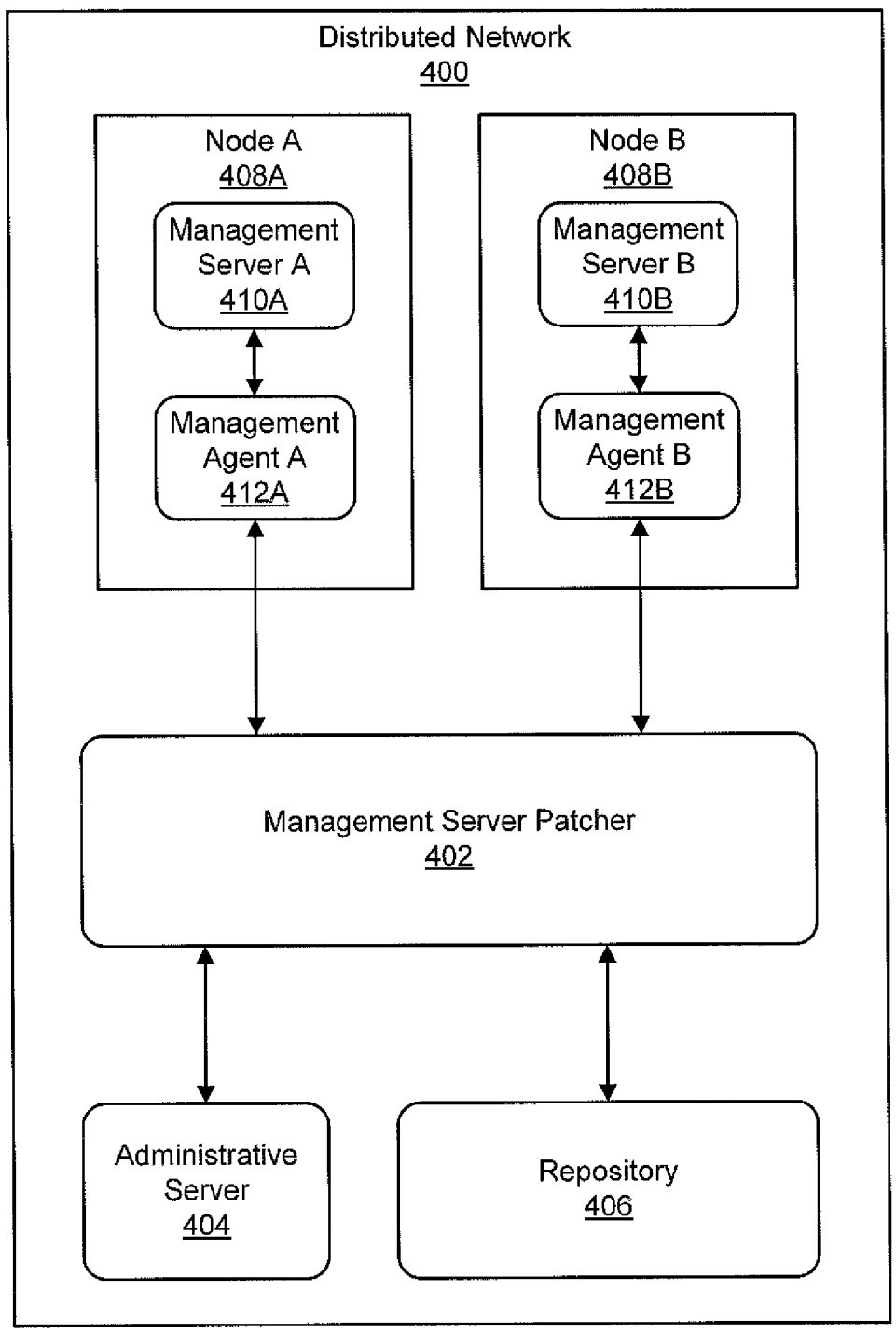
FIGS. 4A and 4B show an example for the distribution and application of a patch in accordance with one embodiment of the invention.
Figure 4B:
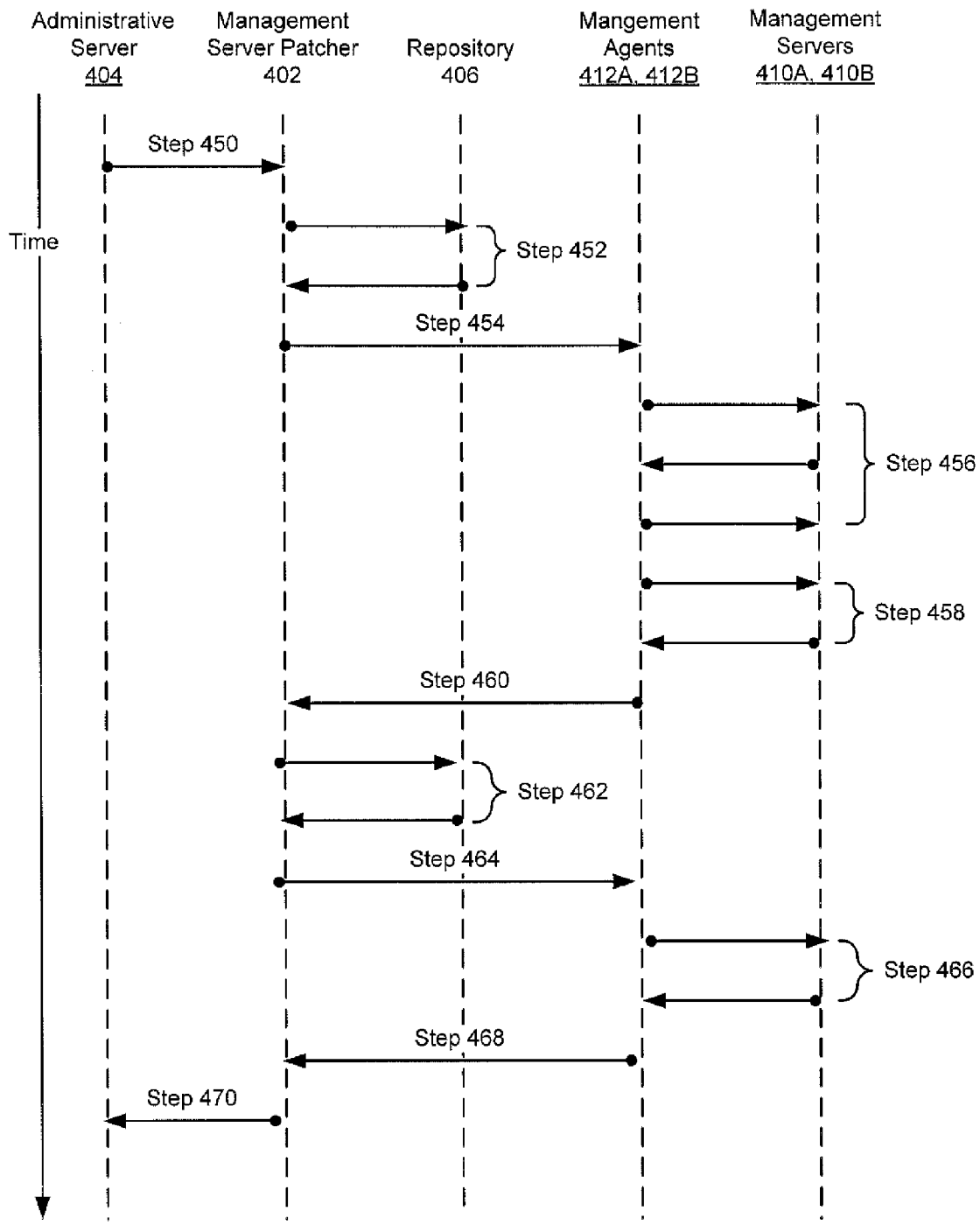

FIGS. 4A and 4B show an example in accordance with one embodiment of the invention. Specifically, FIG. 4A shows an example of the patch distribution system undergoing the activities depicted in the example timeline of FIG. 4B. The distributed network (400) shown in FIG. 4A is much the same as the distributed network (100) of FIGS. 1A and 1B. The distributed network (400) includes a MSP (402), an administrative server (404) a software repository (406) and two nodes (408A, 408B). On each node (408A, 408B) there is a management server (410A, 410B) and a management agent (412A, 412B) controlled by the respective management server (410A, 410B).

In FIG. 4B, at Step 450, the administrative server (404) sends an instruction to the MSP (402) to apply a patch to the management servers (410A, 410B) in the distributed network (400). At Step 452, the MSP (402) retrieves the patch file from the software repository (406). At Step 454, the MSP (402) connects to the management agents (412A, 412B) and stages the patch(es) on the nodes (408A, 408B). At Step 456, the patch(es) are applied to the management servers (410A, 410B) in a sequential manner.

At step 458, one of the attempts to apply a patch to one of the management servers (410A, 410B) fails. At step 460, the management agent (412A, 412B), reports to the MSP (402) that application of the patch to one of the management servers (410A, 410B) has failed. At step 462, the MSP (402) retrieves a fresh copy of the patch file from the software repository (406). At step 464, the MSP (402) instructs the management agents (412A, 412B) to revert the management servers (410A, 410B) to their unpatched state, and sends the fresh copy of the patch to the nodes (408A, 408B). At step 466, the management agents (412A, 412B) apply the patch to the management servers (410A, 410B) a second time, and the application of the patch fails a second time. In step 468, one of the management agents (412A, 412B) notifies the MSP (402) that a second failure has occurred. At step 470, in response to a second failure of the application of the patch, the MSP (402) reports failure to the administrative server (404).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for automatically patching a management server in a distributed network, comprising:
   receiving, at a management server patcher (MSP), an instruction to patch an unpatched management server from an administrative server;
   retrieving, from a software repository, a patch file comprising a patch for the unpatched management server,
      wherein the unpatched management server is configured to manage a distributed application located in the distributed network, and to distribute and apply a plurality of patches to the distributed application,
      wherein the unpatched management server is located on a node of the distributed network, and
      wherein the patch for the unpatched management server is different from any of the plurality of patches that the unpatched management server is configured to distribute and apply to the distributed application;
   establishing, by the MSP, a connection with a management agent located on the node, wherein the management agent is configured to communicate with the unpatched management server;
   sending, over the connection, the patch file to the management agent;
   receiving, by the management agent, from the MSP, the patch file;
   before applying the patch to the unpatched management server:
      creating a duplicate management server;
      shifting an operational load of the unpatched management server to the duplicate management server; and
      taking the unpatched management server offline;
   applying, after taking the unpatched management server offline, by the management agent, the patch to the unpatched management server to obtain a patched management server that, based on the application of the patch, is configured to manage the distributed application differently than the unpatched management server;
   bringing the patched management server online when the patch is successful; and
   shifting the operational load from the duplicate management server to the patched management server.

2. The method of claim 1, wherein establishing the connection with the management agent comprises: using an MSP agent client interface of the MSP, and wherein the unpatched management server communicates with the management agent using an interface that is the same as the MSP agent client interface.

3. The method of claim 1, wherein establishing the connection with the management agent comprises:
establishing trust with the management agent, wherein establishing trust comprises:
retrieving, from the software repository, an encrypted key, wherein the encrypted key is created when the management agent is installed,
decrypting the encrypted key to obtain an unencrypted key, and
sending the unencrypted key to the management agent to establish trust.

4. The method of claim 1, wherein the node is one of a plurality of nodes of the distributed network, and wherein the plurality of nodes comprises a plurality of management servers, wherein the management server is one of the plurality of management servers.

5. The method of claim 4, wherein the plurality of management servers are patched concurrently.

6. The method of claim 4, wherein the plurality of management servers are patched sequentially.

7. The method of claim 1, further comprising
staging, by the management agent, the patch file on the node;
creating, on the node, an execution environment in which to extract and apply the patch; and
extracting, from the patch file, the patch.

8. The method of claim 1, further comprising:
checking, by the management agent, if an additional file is required to apply the patch to the unpatched management server;
retrieving, by the management agent, the additional file necessary for the application of the patch; and
staging, by the management agent, the additional file on the node.

9. The method of claim 1, wherein applying, by the management agent, the patch to the unpatched management server comprises:
notifying the MSP that patching was successful.

10. The method of claim 2 further comprising:
detecting, by the management agent, that application of the patch has failed; and
reverting, in response to detection of failure, the management server to an unpatched state.

11. The method of claim 10 further comprising:
sending, by the management agent, a failure notification to the MSP using the MSP interface.

12. The method of claim 1, further comprising:
receiving, from the node, a first failure notification, wherein the node is one of a plurality of nodes;
instructing other nodes of the plurality of nodes to abort the application of the patch; and
attempting to patch the management server a second time.

13. The method of claim 12, wherein attempting to patch the management server a second time comprises:
retrieving a second patch file from the software repository; and
distributing the second patch file to the node.

14. The method of claim 12, further comprising:
receiving, from one of the plurality of nodes, a second failure notification; and
returning, in response to the second failure notification, a failure condition.

15. A distributed network, comprising:
a first node, comprising:
a processor and a memory;
an unpatched management server comprising an agent client layer and configured to manage a distributed application and to distribute and apply a plurality of patches to the distributed application;
a management agent, configured to:
establish a connection with the agent client layer;
receive, via the connection, a patch file;
before applying the patch to the unpatched management server:
create a duplicate management server;
shift an operational load of the unpatched management server to the duplicate management server; and
take the unpatched management server offline;
apply after taking the unpatched management server offline, a patch contained within the patch file to the unpatched management server to obtain a patched management server,
wherein the patch for the unpatched management server is different from any of the plurality of patches that the unpatched management server is configured to distribute and apply to the distributed application, and
wherein the patched management server, based on the application of the patch, is configured to manage the distributed application differently than the unpatched management server;
bring the patched management server online when the patch is successful; and
shift the operational load from the duplicate management server to the patched management server; and
a management server patcher (MSP), comprising:
an MSP agent client layer, configured to establish a connection with the management agent in an identical manner to the agent client layer;
a secure services layer, configured to communicate with a repository software repository and an administrative server; and
a patcher module, configured to:
receive, via the secure services layer, instructions to distribute the patch file from the administrative server;
retrieve, via the secure services layer, the patch file from the software repository; and
distribute the patch file to the node using the connection between the MSP agent client layer and the management agent.

16. The distributed network of claim 15, wherein the MSP is located on the node.

17. The distributed network of claim 15, wherein the node is one of a plurality of nodes.

18. A non-transitory computer readable medium, comprising instructions to:
receive, at a management server patcher (MSP), an instruction to patch an unpatched management server from an administrative server;
retrieve, from a software repository, a patch file comprising a patch for the unpatched management server,
wherein the unpatched management server is configured to manage a distributed application located in the distributed network and to distribute and apply a plurality of patches to the distributed application,
wherein the unpatched management server is located on a node of the distributed network, and wherein the patch for the unpatched management server is not the same as the plurality of patches that the unpatched management server is configured to distribute and apply to the distributed application;

establish, by the MSP, a connection with a management agent located on the node, wherein the management agent is configured to communicate with the unpatched management server over the network and manage a part of the distributed application that is located on the node;

send, over the connection, the patch file to the management agent;

receive, by the management agent, from the MSP, the patch file;

before applying the patch to the unpatched management server:
  create a duplicate management server;
  shift an operational load of the unpatched management server to the duplicate management server; and
  take the unpatched management server offline;

apply, after taking the unpatched management server offline, by the management agent, the patch to the unpatched management server to obtain a patched management server that, based on the application of the patch, is configured to manage the distributed application differently than the unpatched management server;

bringing the patched management server online when the patch is successful; and shifting the operational load from the duplicate management server to the patched management server.

19. The non-transitory computer readable medium of claim 18, further comprising instructions for the management agent to:
  stage the patch file on the node;
  create, on the node, an execution environment in which to extract and apply the patch;
  extract, from the patch file, the patch;
  check, if an additional file is required to apply the patch to the unpatched management server;
  retrieve the additional file necessary for the application of the patch; and
  stage the additional file on the node;
  apply the patch.

20. The non-transitory computer readable medium of claim 18, further comprising instructions to:
  receive, from the node, a first failure notification, wherein the node is one of a plurality of nodes;
  instruct other nodes of the plurality of nodes to abort the application of the patch; and
  attempt to patch the management server a second time;
  receive, from one of the plurality of nodes, a second failure notification; and
  return, in response to the second failure notification, a failure condition.

* * * * *